United States Patent
Hashida (12)

(10) Patent No.: US 10,712,890 B2
(45) Date of Patent: Jul. 14, 2020

(54) INPUT APPARATUS AND MANUFACTURING METHOD OF INPUT APPARATUS

(71) Applicant: Alps Alpine Co., Ltd., Ota-ku, Tokyo (JP)

(72) Inventor: Junji Hashida, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 16/515,987

(22) Filed: Jul. 18, 2019

(65) Prior Publication Data

US 2019/0369774 A1  Dec. 5, 2019

Related U.S. Application Data

(63) Continuation of application No. 15/939,002, filed on Mar. 28, 2018, now Pat. No. 10,402,032, which is a
(Continued)

(30) Foreign Application Priority Data

Oct. 13, 2015 (JP) .................................. 2015-201740

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04102* (2013.01); *G06F 2203/04103* (2013.01)

(58) Field of Classification Search
CPC ...................................................... G06F 3/044
(Continued)

(56) References Cited

U.S. PATENT DOCUMENTS

2011/0109583 A1* 5/2011 Lee .......................... G06F 3/044
345/174
2016/0216790 A1* 7/2016 Ebihara ................... G06F 3/044
(Continued)

FOREIGN PATENT DOCUMENTS

JP  2009-130283  6/2009
JP  2012-141846  7/2012
(Continued)

OTHER PUBLICATIONS

International Search Report from International Application No. PCT/JP2016/070197 dated Dec. 13, 2016.

*Primary Examiner* — Stanley Tso
(74) *Attorney, Agent, or Firm* — Beyer Law Group LLP

(57) ABSTRACT

An input apparatus includes a sensor film having a first curved surface and a second curved surface, the first curved surface being light-transmissive and provided in a detection area in which a sensor is formed, the second curved surface being provided in a non-detection area other than the detection area and having a radius of curvature smaller than a radius of curvature of the first curved surface; a resin layer provided on the sensor film and formed of a material containing a light-transmissive resin; and an extension-suppression layer provided in the detection area in the sensor film, the extension-suppression layer suppressing an extension amount of the detection area in the sensor film to be smaller than an extension amount of the non-detection area in the sensor film.

9 Claims, 11 Drawing Sheets

Related U.S. Application Data continuation of application No. PCT/JP2016/080197, filed on Oct. 12, 2016.

(58) Field of Classification Search
USPC .......................................................... 345/173
See application file for complete search history.

(56) References Cited

U.S. PATENT DOCUMENTS

| | | |
|---|---|---|
| 2016/0227623 A1 | 8/2016 | Yoo |
| 2018/0217702 A1 | 8/2018 | Hashida |

FOREIGN PATENT DOCUMENTS

| | | | |
|---|---|---|---|
| JP | 2014-026384 | * | 7/2012 |
| JP | 2013-246741 | | 12/2013 |
| JP | 2014-26384 | | 2/2014 |

* cited by examiner

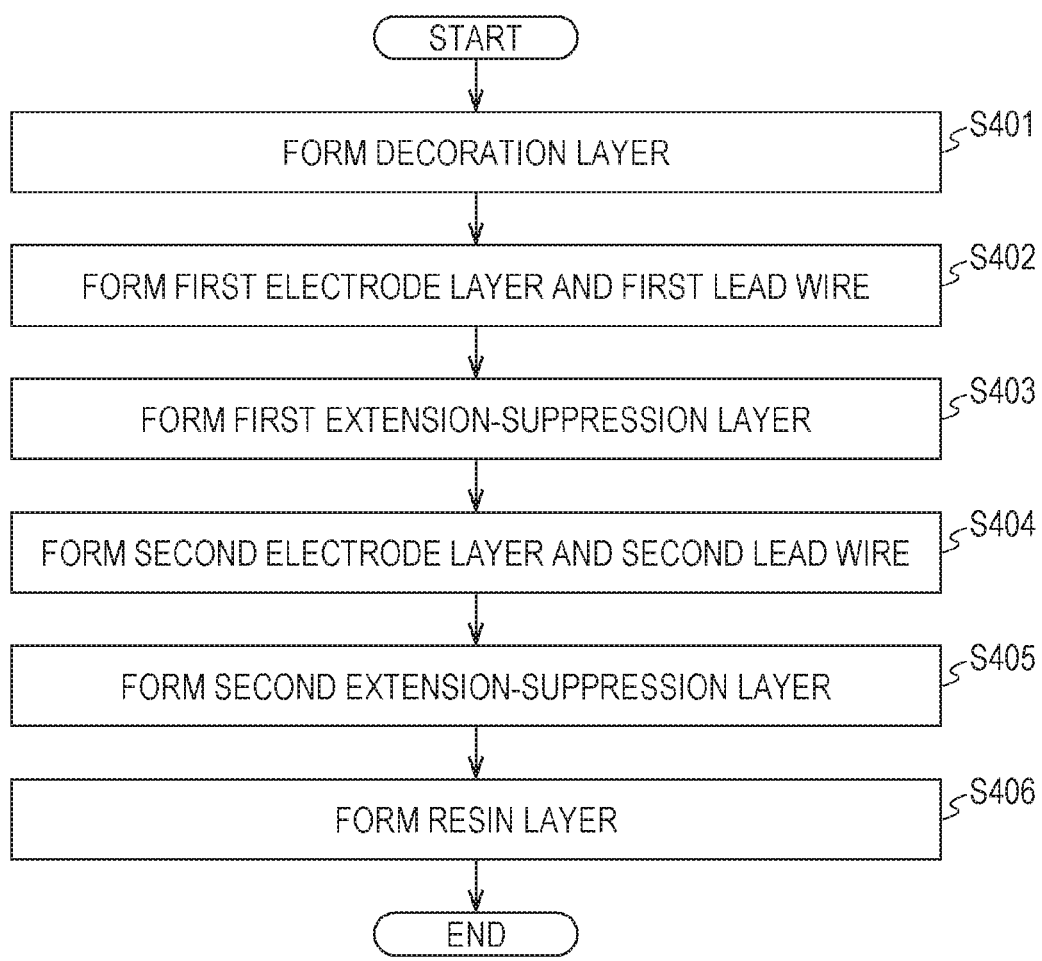

INPUT APPARATUS AND MANUFACTURING METHOD OF INPUT APPARATUS

CLAIM OF PRIORITY

This application is a Continuation of U.S. patent application Ser. No. 15/939,002, filed on Mar. 28, 2018, which is in turn a Continuation of International Application No. PCT/JP2016/080197 filed on Oct. 12, 2016, which claims benefit of Japanese Patent Application No. 2015-201740 filed on Oct. 13, 2015. The entire contents of each application noted above are hereby incorporated by reference.

BACKGROUND OF THE INVENTION

1. Field of the Invention

The present invention relates to input apparatuses and manufacturing methods of the input apparatuses and particularly to an input apparatus including a sensor film having a two-dimensional or three-dimensional curved surface and a manufacturing method of the input apparatus.

2. Description of the Related Art

In information processing apparatuses, light-transmissive input apparatuses are disposed in front of display panels such as color liquid crystal panels. Such an input apparatus is referred to as a touch panel. In the touch panel, an electrostatic capacitance is formed between electrodes, and when a person's finger approaches, coordinates of the approach position of the finger is determined on the basis of a change of charge transfer. The change of charge transfer is detected by a capacitive sensor.

Recent years have seen the emergence of display apparatuses that display images on two-dimensional or three-dimensional curved surfaces. Display apparatuses having shapes corresponding to such curved display surfaces also need to be built in touch panels.

Japanese Unexamined Patent Application Publication No. 2009-130283 discloses an external case for an electronic apparatus provided with a sensor film having a three-dimensional curved surface. In the external case for an electronic apparatus disclosed in Japanese Unexamined Patent Application Publication No. 2009-130283, a base formed of a synthetic resin is provided between a first film having predetermined color (coloring), pattern, or the like and a second film having an electrode portion and a conductive pattern.

Japanese Unexamined Patent Application Publication No. 2009-130283 further discloses a step in which, as a manufacturing method of the external case for an electronic apparatus, the first film and the second film are disposed in a die, a molten resin for forming the base is poured between the first film and the second film, and the molten resin is solidified so as to integrate the first film and the second film with the base. Japanese Unexamined Patent Application Publication No. 2009-130283 further discloses preforming by heating each film as a preceding step of disposing the first film and the second film in the die.

Japanese Unexamined Patent Application Publication No. 2013-246741 discloses a three-dimensional curved surface touch panel including a transparent base sheet, a main electrode layer formed by using conductive ink, and an auxiliary electrode layer formed by using conductive ink. The three-dimensional curved surface touch panel disclosed in Japanese Unexamined Patent Application Publication No. 2013-246741 is formed by disposing, in a die having a three-dimensional curved surface, a stack of three layers (the base sheet, the main electrode layer, and the auxiliary electrode layer) that have initially been flat and thermally softening the stack so as to deform the stack in accordance with the three-dimensional curved surface of the die.

However, it is difficult to locally control an extension portion of the sensor film in preforming or In-Mold Lamination (IML). Thus, an extension state of the sensor film depends on a total extension amount of the entire touch panel having a three-dimensional curved surface.

For example, even in a case in which a sufficiently gentle curved surface is provided in an area (detection area) in which a sensor is formed, if an area (non-detection area: a frame portion or the like) other than the area in which a sensor is formed includes a curved surface having a radius of curvature (minimum radius of curvature) smaller than a radius of curvature of the curved surface in the detection area, the total extension amount of the entire touch panel becomes relatively long. Accordingly, if a curved surface having the minimum radius curvature is present in the non-detection area, a tensile strength is generated by the extension of the non-detection area and might possibly affect the detection area in the sensor film in such a manner that the detection area extends more than an allowable extension amount and is destructed. Thus, the shape of a touch panel is restricted by the extension amount of the curved surface having the minimum radius of curvature.

As one of measures against this, a sensor film may be formed only in the detection area and may be excluded from the non-detection area. However, this measure allows an end portion of an object obtained by molding such as IML to remain in the touch panel so as to cross the touch panel. The end portion of the object obtained by molding such as IML is a portion where the constituent of material changes and is a portion where stresses applied to the touch panel are concentrated. If such a portion is present across the touch panel, the strength of the touch panel significantly decreases.

SUMMARY OF THE INVENTION

The present invention has been made to solve the above problem of the related art and provides an input apparatus that can locally control an extension portion of a sensor film having a two-dimensional or three-dimensional curved surface and that can suppress destruction of a detection area in the sensor film, and a manufacturing method of the input apparatus.

An input apparatus according to an aspect of the present invention includes a sensor film having a first curved surface and a second curved surface, the first curved surface being light-transmissive and provided in a detection area in which a sensor is formed, the second curved surface being provided in a non-detection area other than the detection area and having a radius of curvature smaller than a radius of curvature of the first curved surface; a resin layer provided on the sensor film and formed of a material containing a light-transmissive resin; and an extension-suppression layer provided in the detection area in the sensor film, the extension-suppression layer suppressing an extension amount of the detection area in the sensor film to be smaller than an extension amount of the non-detection area in the sensor film.

With the input apparatus, the extension-suppression layer is provided in the detection area in the sensor film, and the extension amount of the detection area in the sensor film is suppressed to be smaller than the extension amount of the non-detection area in the sensor film when the resin layer is molded in a mold. Accordingly, even if the second curved surface is present in the non-detection area in the sensor film, the second curved surface having the radius of curvature smaller than the radius of curvature of the first curved surface provided in the detection area in the sensor film, the extension amount of the detection area in the sensor film becomes smaller than the extension amount of the non-detection area in the sensor film.

Accordingly, the extension amount of the detection area in the sensor film can fall within a range of an allowable extension amount. This makes it possible to locally control the extension portion of the sensor film having a two-dimensional or three-dimensional curved surface and to suppress destruction of the detection area in the sensor film. Therefore, it is possible to cancel the restriction of the extension amount of the area of the second curved surface (minimum radius of curvature area) by the shape of the input apparatus and to realize the input apparatus having a desired three-dimensional curved surface.

In the input apparatus, the sensor film may have a first surface formed as a convex-curve three-dimensional surface and a second surface facing away from the first surface, the resin layer may be provided on a side of the first surface, and the extension-suppression layer may be provided on at least one of sides of the first surface and the second surface. Accordingly, by providing the extension-suppression layer in the detection area in the sensor film before the resin layer is formed, it becomes possible to locally control the extension portion of the sensor film having a two-dimensional or three-dimensional curved surface and to suppress destruction of the detection area in the sensor film.

In the input apparatus, the sensor film may have a first surface formed as a convex-curve three-dimensional surface and a second surface facing away from the first surface, the extension-suppression layer may be provided on a side of the second surface, and the resin layer may be provided to face away from the sensor film as viewed from the extension-suppression layer. Accordingly, by providing the extension-suppression layer in the detection area in the sensor film before the resin layer is formed, it becomes possible to locally control the extension portion of the sensor film having a two-dimensional or three-dimensional curved surface and to suppress destruction of the detection area in the sensor film.

In addition, the resin layer is provided on the side of the second surface of the sensor film on which the extension-suppression layer is formed. That is, the sensor film is present in front of the resin layer in the input apparatus. Thus, even if the resin layer is damaged, scattering of the resin layer can be suppressed.

In the input apparatus, the sensor film may include a light-transmissive base in a form of a film, and the extension-suppression layer may be formed of a same material as a material of the base. Accordingly, the extension-suppression layer can protect the detection area in the sensor film. In addition, since the base of the sensor film and the extension-suppression layer have equal extensibility, hardenability, or the like, a step of forming the sensor film and the extension-suppression layer can be controlled relatively easily.

In the input apparatus, the extension-suppression layer may have a thickness equal to a thickness of the base. Accordingly, the extension amount of the detection area in the sensor film can be suppressed to about 50 percent (%) of that in a case in which the extension-suppression layer is not provided.

In the input apparatus, the sensor film may be a first sensor film, the extension-suppression layer may be a first extension-suppression layer, the input apparatus may further include a second sensor film and a second extension-suppression layer, the second sensor film being different from the first sensor film and having a third curved surface and a fourth curved surface and including the detection area and the non-detection area, the third curved surface being light-transmissive and provided in the detection area, the fourth curved surface being provided in the non-detection area and having a radius of curvature smaller than a radius of curvature of the third curved surface, the second extension-suppression layer being provided in the detection area in the second sensor film and suppressing an extension amount of the detection area in the second sensor film to be smaller than an extension amount of the non-detection area in the second sensor film, and the resin layer may be provided between the first sensor film and the second sensor film.

Accordingly, even if a plurality of sensor films are provided, the extension amount of each of the plurality of sensor films can fall within a range of the allowable extension amount. This makes it possible to locally control extension portions of the respective plurality of sensor films and to suppress destruction of the detection area in the plurality of sensor films. Therefore, it is possible to cancel the restriction of the extension amount of the second curved surface and the fourth curved surface (minimum radius of curvature area) by the shape of the input apparatus and to realize the input apparatus having a desired three-dimensional curved surface.

In the input apparatus, the first sensor film may include a light-transmissive first base in a form of a film, the first extension-suppression layer may be formed of a same material as a material of the first base, the second sensor film may include a light-transmissive second base in a form of a film, and the second extension-suppression layer may be formed of a same material as a material of the second base. Accordingly, the first extension-suppression layer can protect the detection area in the first sensor film, and the second extension-suppression layer can protect the second sensor film. In addition, since the base of the first sensor film and the first extension-suppression layer have equal extensibility, hardenability, or the like, and the base of the second sensor film and the second extension-suppression layer have equal extensibility, hardenability, or the like, a step of forming the first sensor film, the first extension-suppression layer, the second sensor film, and the second extension-suppression layer can be controlled relatively easily.

In the input apparatus, the first extension-suppression layer may have a thickness equal to a thickness of the first base, and the second extension-suppression layer may have a thickness equal to a thickness of the second base.

A manufacturing method of an input apparatus according to an aspect of the present invention includes a step of forming a sensor film including a detection area in which a sensor is formed and a non-detection area other than the detection area; a step of forming an extension-suppression layer in the detection area in the sensor film, the extension-suppression layer suppressing an extension amount of the detection area in the sensor film to be smaller than an extension amount of the non-detection area in the sensor film; and a step of forming a resin layer on the sensor film by pouring a material containing a light-transmissive resin into a mold in which the sensor film on which the extension-suppression layer is formed is inserted. In the step of forming a resin layer, a first curved surface is formed in the detection area in the sensor film, and a second curved surface is formed in the non-detection area in the sensor film, the second curved surface having a radius of curvature smaller than a radius of curvature of the first curved surface.

With the manufacturing method, even if the second curved surface is present in the non-detection area in the sensor film, the second curved surface having the radius of curvature smaller than the radius of curvature of the first curved surface provided in the detection area in the sensor film, it is possible to manufacture the input apparatus in which the extension amount of the detection area in the sensor film can be suppressed to be smaller than the extension amount of the non-detection area in the sensor film.

Accordingly, the extension amount of the detection area in the sensor film can fall within a range of an allowable extension amount. This makes it possible to locally control the extension portion of the sensor film having a two-dimensional or three-dimensional curved surface and to suppress destruction of the detection area in the sensor film. Therefore, it is possible to cancel the restriction of the extension amount of the area of the second curved surface (minimum radius of curvature area) by the shape of the input apparatus and to manufacture the input apparatus having a desired three-dimensional curved surface.

In the manufacturing method, the sensor film may have a first surface formed as a convex curved surface and a second surface facing away from the first surface, the step of forming a resin layer may include a step of providing the resin layer on a side of the first surface, and the step of forming an extension-suppression layer may include a step of providing the extension-suppression layer on at least one of sides of the first surface and the second surface. Accordingly, by providing the extension-suppression layer in the detection area in the sensor film before the resin layer is formed, it becomes possible to locally control the extension portion of the sensor film having a two-dimensional or three-dimensional curved surface and to suppress destruction of the detection area in the sensor film.

In the manufacturing method, the sensor film may have a first surface formed as a convex curved surface and a second surface facing away from the first surface, the step of forming an extension-suppression layer may include a step of providing the extension-suppression layer on a side of the second surface, and the step of forming a resin layer may include a step of providing the resin layer to face away from the sensor film as viewed from the extension-suppression layer. Accordingly, by providing the extension-suppression layer in the detection area in the sensor film before the resin layer is formed, it becomes possible to locally control the extension portion of the sensor film having a two-dimensional or three-dimensional curved surface and to suppress destruction of the detection area in the sensor film.

The manufacturing method may include, in place of forming the first curved surface and the second curved surface in the step of forming a resin layer, as a preceding step of the step of forming a resin layer, a step of forming the first curved surface and the second curved surface by heating the sensor film. Accordingly, even if the second curved surface is present in the non-detection area in the sensor film, the second curved surface having the radius of curvature smaller than the radius of curvature of the first curved surface provided in the detection area in the sensor film, it is possible to manufacture the input apparatus in which the extension amount of the detection area in the sensor film can be suppressed to be smaller than the extension amount of the non-detection area in the sensor film.

In addition, if the sensor film on which the extension-suppression layer is formed is heated to form the first curved surface and the second curved surface before the sensor film is inserted in a mold, the sensor film and the extension-suppression layer can be accurately set in the mold. Thus, a molten resin for forming the resin layer can be applied to the entire cavity, increasing the degree of completeness at the time of molding. That is, generation of defective pieces can be suppressed, and the quality of the input apparatus can be enhanced.

In the manufacturing method, the sensor film may be a first sensor film, the extension-suppression layer may be a first extension-suppression layer, the manufacturing method may further include a step of forming a second sensor film and a step of forming a second extension-suppression layer, the second sensor film being different from the first sensor film and including the detection area and the non-detection area, the second extension-suppression layer being provided in the detection area in the second sensor film and suppressing an extension amount of the detection area in the second sensor film to be smaller than an extension amount of the non-detection area in the second sensor film, and the step of forming a resin layer may include a step of providing the resin layer between the first sensor film and the second sensor film, and a step of forming a third curved surface in the detection area in the second sensor film and a fourth curved surface in the non-detection area in the second sensor film, the fourth curved surface having a radius of curvature smaller than a radius of curvature of the third curved surface.

Accordingly, even if a plurality of sensor films are provided, the extension amount of each of the plurality of sensor films can fall within a range of the allowable extension amount. This makes it possible to locally control extension portions of the respective plurality of sensor films and to suppress destruction of the detection area in the plurality of sensor films. Therefore, it is possible to cancel the restriction of the extension amount of the second curved surface and the fourth curved surface (minimum radius of curvature area) by the shape of the input apparatus and to manufacture the input apparatus having a desired three-dimensional curved surface.

The manufacturing method may include, in place of forming the first curved surface, the second curved surface, the third curved surface, and the fourth curved surface in the step of forming a resin layer, as a preceding step of the step of forming a resin layer, a step of forming the first curved surface and the second curved surface by heating the first sensor film and a step of forming the third curved surface and the fourth curved surface by heating the second sensor film. Accordingly, even if the second curved surface is present in the non-detection area in the first sensor film, the second curved surface having the radius of curvature smaller than the radius of curvature of the first curved surface provided in the detection area in the first sensor film, it is possible to manufacture the input apparatus in which the extension amount of the detection area in the first sensor film can be suppressed to be smaller than the extension amount of the non-detection area in the first sensor film. In addition, even if the fourth curved surface is present in the non-detection area in the second sensor film, the fourth curved surface having the radius of curvature smaller than the radius of curvature of the third curved surface provided in the detection area in the second sensor film, it is possible to manufacture the input apparatus in which the extension amount of the detection area in the second sensor film can be suppressed to be smaller than the extension amount of the non-detection area in the second sensor film.

In addition, if the first sensor film on which the first extension-suppression layer is formed and the second sensor film on which the second extension-suppression layer is formed are heated to form the first curved surface, the second curved surface, the third curved surface, and the fourth curved surface before the first sensor film and the second sensor film are inserted in a mold, the first sensor film, the first extension-suppression layer, the second sensor film, and the second extension-suppression layer can be accurately set in the mold. Thus, a molten resin for forming the resin layer can be applied to the entire cavity, increasing the degree of completeness at the time of molding. That is, generation of defective pieces can be suppressed, and the quality of the input apparatus can be enhanced.

BRIEF DESCRIPTION OF THE DRAWINGS

FIG. 12 is a flowchart of still another exemplary manufacturing method of the input apparatus according to the embodiment;

DESCRIPTION OF THE PREFERRED EMBODIMENTS

Figure 1:
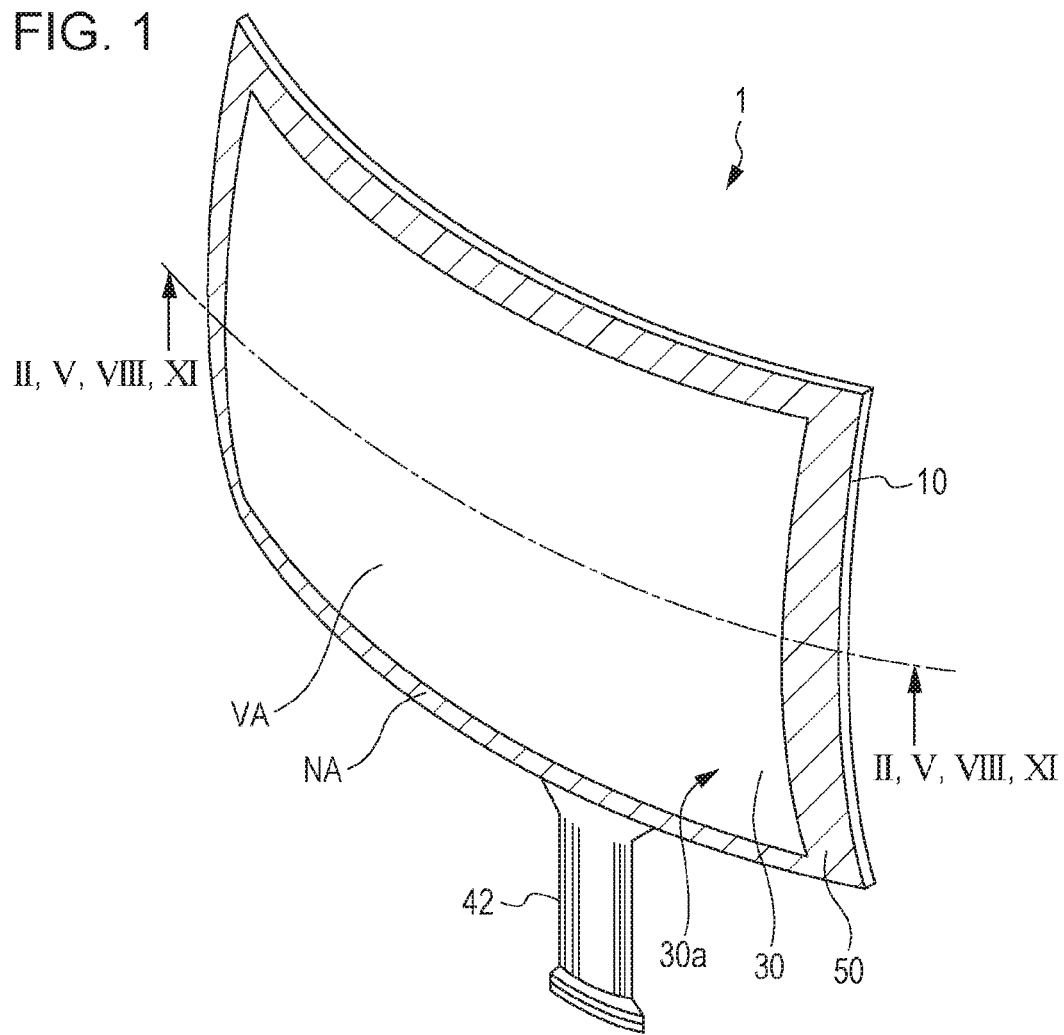
FIG. 1 is a perspective view of an exemplary input apparatus according to an embodiment.

Now, an embodiment of the present invention will be described with reference to the drawings. Note that the same components will be denoted by the same reference numerals in the following description, and repetitive description of the components will be omitted as appropriate.

Figure 2:
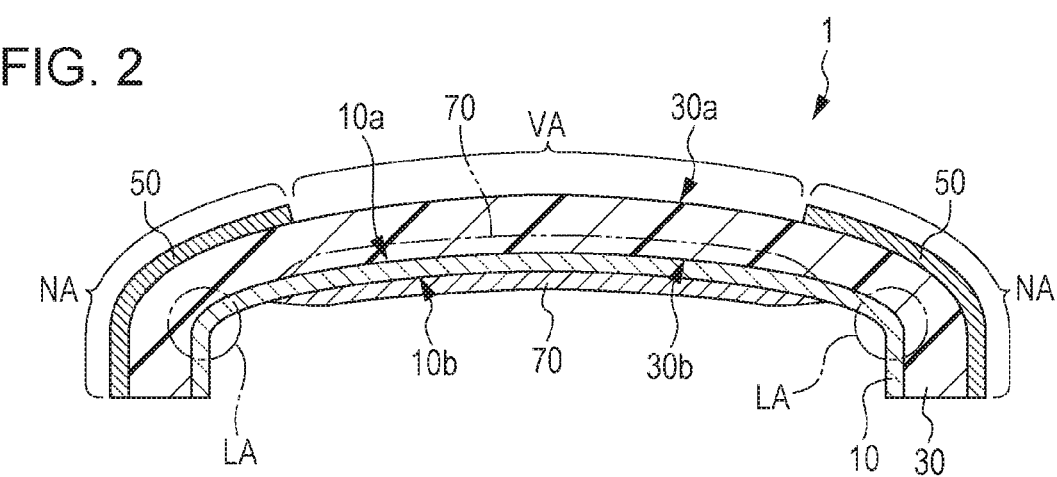
FIG. 2 is a schematic cross-sectional view of the input apparatus according to the embodiment, taken along line II-II in FIG. 1.

FIG. 1 is a perspective view of an exemplary input apparatus according to the embodiment. FIG. 2 is a schematic cross-sectional view of the input apparatus according to the embodiment, taken along line II-II in FIG. 1.

The input apparatus according to the embodiment is, for example, a touch panel having a curved surface. An input apparatus 1 includes a sensor film 10, a resin layer 30, a decoration layer 50, and an extension-suppression layer 70.

The sensor film 10 is light-transmissive and includes a transparent base in the form of a film made of polyethylene terephthalate (PET) or the like.

The term "transparent" and the term "light-transmissive" herein refer to a state in which the visible-light transmittance is 50% or higher (preferably 80% or higher). In addition, the haze is preferably 6% or lower. The term "light-blocking" and the term "light-blocking property" herein refer to a state in which the visible-light transmittance is lower than 50% (preferably lower than 20%).

The sensor film 10 has a first surface 10a, which is a curved surface. The first surface 10a is, for example, a convex-curve three-dimensional surface. In the embodiment, the first surface 10a side is a three-dimensional surface, which is a convex curve in both vertical and horizontal directions.

A second surface 10b faces away from the first surface 10a of the sensor film 10. The sensor film 10 has a uniform thickness, and thus, the second surface 10b and the first surface 10a are substantially the same three-dimensional curved surfaces. Note that the first surface 10a and the second surface 10b may be in other shapes, such as two-dimensional curved surfaces or concave surfaces. In the embodiment, normal directions with respect to the curve of the first surface 10a are each referred to as a thickness direction or a stacking direction.

In the sensor film 10, an area (detection area) VA in which sensors are formed is provided with an electrode layer. The detection area VA is an area that is operable by an operation element such as a finger. The electrode layer is omitted from FIG. 2 for the convenience of description.

In the sensor film 10, an area (non-detection area) NA other than the area in which the sensors are formed is provided with a lead wire 42. For example, the non-detection area NA is an area that surrounds the detection area VA (outside the detection area VA) and is a decoration area (area covered with the decoration layer 50) in the form of a frame. The lead wire 42 includes, as illustrated in FIG. 1, a flexible wiring board that extends outside from the sensor film 10 and a wire that is connected to the electrode layer and led outside the detection area VA in the sensor film 10.

The electrode layer is provided on at least one of the first surface 10a of the sensor film 10 and the second surface 10b of the sensor film 10. The electrode layer is light-transmissive and is one of detection electrodes in a touch sensor. The electrode layer is formed of indium tin oxide (ITO), a light-transmissive organic conductive material, a metal nanowire, or the like.

In a case in which the touch sensor is a capacitive touch sensor, a plurality of electrode layers are formed. For example, the input apparatus 1 detects a change in electrostatic capacitance between the plurality of electrode layers when a finger or another object approaches the sensor film 10, thereby detecting a touch position.

The resin layer 30 is formed on the sensor film 10 to cover the detection area VA and the non-detection area NA. The resin layer 30 is light-transmissive and is formed by injection molding in which a material containing a molten synthetic resin such as polycarbonate or acrylic resin is injected into a mold.

The decoration layer 50 is formed on a first surface 30a of the resin layer 30 to cover the non-detection area NA. The decoration layer 50 may also be formed on a second surface 30b of the resin layer 30 to cover the non-detection area NA. The decoration layer 50 has a light-blocking property. Thus, it is not possible to see a wire (part of the lead wire 42) that is led outside the detection area VA in the sensor film 10 from the first surface 30a side of the resin layer 30.

The extension-suppression layer 70 is provided in the detection area VA on the second surface 10b side of the sensor film 10. Note that the extension-suppression layer 70 may also be provided in the detection area VA on the first surface 10a side of the sensor film 10 as illustrated as the extension-suppression layer 70 marked with the chain double-dashed line in FIG. 2. That is, the extension-suppression layer 70 is provided on at least one of the second surface 10b side of the sensor film 10 and the first surface 10a side of the sensor film 10. The extension-suppression layer 70 is formed on the second surface 10b of the sensor film 10 by bonding using an adhesive or the like, application, thermal fusion, or the like. The material of the extension-suppression layer 70 is not limited to a particular material. Examples of the material of the extension-suppression layer 70 include a light-transmissive thermosetting or thermoplastic resin, a relatively high cross-linked thermosetting or thermoplastic resin, and the like. As the material of the extension-suppression layer 70, the same material as the material of the base of the sensor film 10 is preferably used. If the material of the extension-suppression layer 70 is the same as the material of the base of the sensor film 10, the extension-suppression layer 70 can protect the detection area VA in the sensor film 10.

As illustrated in FIG. 2, the sensor film 10 of the input apparatus 1 according to the embodiment has a three-dimensional curved surface (first curved surface) in the detection area VA and a three-dimensional curved surface (second curved surface) in the non-detection area NA (minimum radius of curvature area LA), the second curved surface having a radius of curvature (minimum radius of curvature) smaller than a radius of curvature of the three-dimensional curved surface (first curved surface) in the detection area VA. If the extension-suppression layer 70 is not provided, the curved surface (second curved surface) having the minimum radius of curvature in the non-detection area NA of the sensor film 10 causes the minimum radius of curvature area LA to extend. Thus, a tensile stress generated by the extension might possibly affect the detection area in the sensor film 10 in such a manner that the detection area extends more than an allowable extension amount and is destructed, even if a sufficiently gentle (sufficiently large radius of curvature) curved surface (first curved surface) is provided in the detection area.

In contrast, the input apparatus 1 according to the embodiment includes the extension-suppression layer 70. The extension-suppression layer 70 is provided on the second surface 10b of the sensor film 10 and suppresses the extension amount of the detection area VA in the sensor film 10 to be smaller than the extension amount of the non-detection area NA in the sensor film 10 when the resin layer 30 is molded in a mold.

Thus, despite the presence of the curved surface (second curved surface) having the minimum radius of curvature in the non-detection area NA in the sensor film 10, the extension amount of the detection area VA in the sensor film 10 is smaller than the extension amount of the non-detection area NA in the sensor film 10. In other words, the extension amount of the non-detection area NA in the sensor film 10 is larger than the extension amount of the detection area VA in the sensor film 10. Accordingly, the extension amount of the detection area VA in the sensor film 10 in can fall within a range of the allowable extension amount. This makes it possible to locally control the extension portion of the sensor film 10 having a two-dimensional or three-dimensional curved surface and to suppress destruction of the detection area VA in the sensor film 10. Therefore, it is possible to cancel the restriction on the extension amount of the minimum radius of curvature area LA by the shape of the input apparatus 1 and to realize the input apparatus 1 having a desired three-dimensional curved surface.

In a case in which the input apparatus 1 has a configuration of a plurality of divided sensor blocks, the extension-suppression layer 70 is formed independently for each block, thereby realizing a shape in which curved surfaces (second curved surfaces) having the minimum radius of curvature are connected between the sensor blocks. An example of the input apparatus 1 having a configuration of a plurality of divided sensor blocks is a polyhedron with edge lines thereabout, such as a box shape.

Effects of the extension-suppression layer 70 according to the embodiment will further be described with reference to some drawings regarding a manufacturing method of the input apparatus 1.

Figure 3:
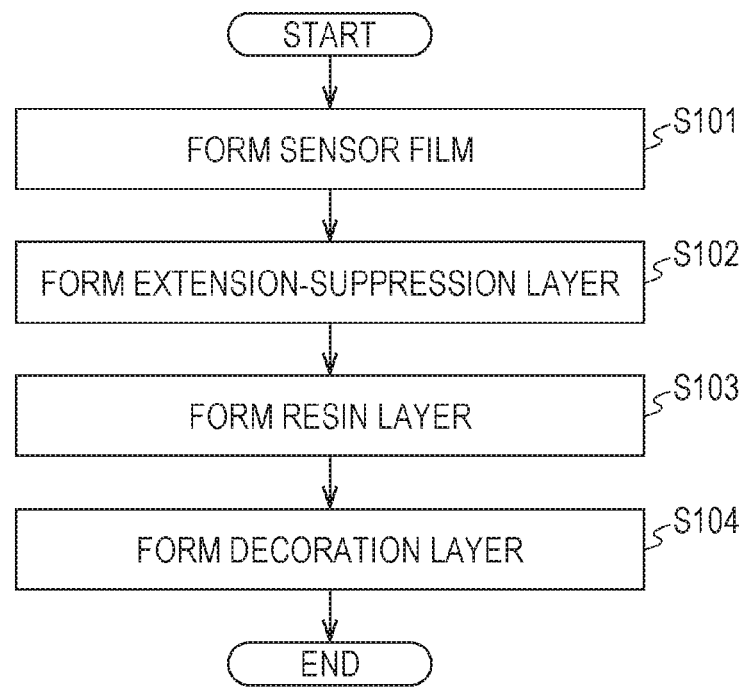
FIG. 3 is a flowchart of an exemplary manufacturing method of the input apparatus according to the embodiment.

FIG. 3 is a flowchart of an exemplary manufacturing method of the input apparatus according to the embodiment. FIGS. 4A to 4D are each a schematic cross-sectional view for illustrating the exemplary manufacturing method of the input apparatus according to the embodiment.

As illustrated in FIG. 3, the manufacturing method of the input apparatus 1 according to the embodiment includes formation of the sensor film 10 (step S101), formation of the extension-suppression layer 70 (step S102), formation of the resin layer 30 (step S103), and formation of the decoration layer 50 (step S104).

Figure 4A:
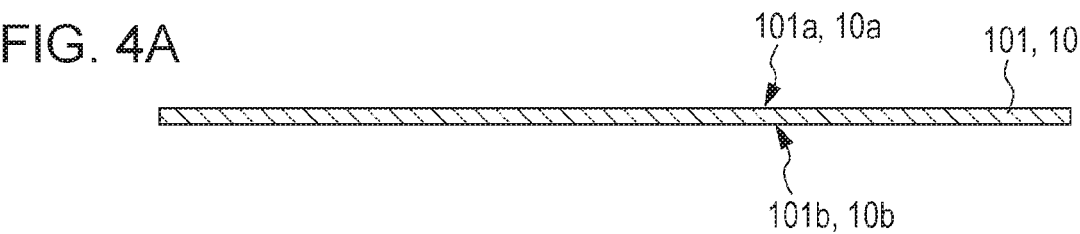
FIGS. 4A to 4D are each a schematic cross-sectional view for illustrating the exemplary manufacturing method of the input apparatus according to the embodiment.

First, in the formation of the sensor film 10 in step S101, as illustrated in FIG. 4A, a transparent base 101 is prepared. For example, a base in the form of a film made of polyethylene terephthalate (PET) is used as the transparent base 101. Then, the electrode layer and the lead wire 42 (see FIG. 1) are formed on at least one of a first surface 101a and a second surface 101b of the transparent base 101. The electrode layer and the lead wire 42 are formed by photolithography, etching, and screen printing. For example, if photolithography and etching are employed, an ITO layer is formed on a surface of the transparent base 101 by sputtering, and a resist is formed on the ITO layer. The resist is exposed and developed so as to form a pattern, and then the ITO layer is etched. Then, the resist is stripped. Accordingly, an electrode layer formed of the ITO layer that has been patterned on at least one of the first surface 101a and the second surface 101b of the transparent base 101 is formed. Thus, the sensor film 10 is formed.

Figure 4B:
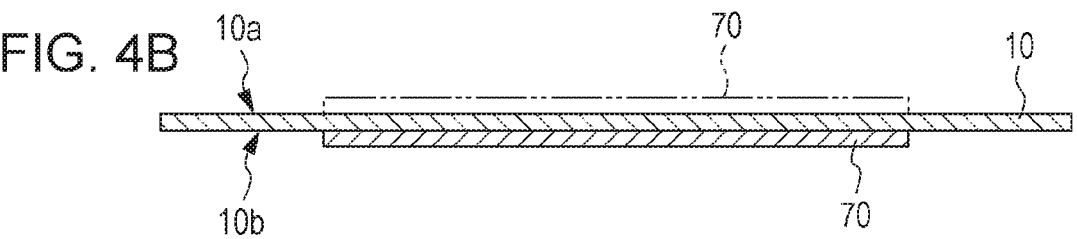

Then, in the formation of the extension-suppression layer 70 step S102, as illustrated in FIG. 4B, the extension-suppression layer 70 is formed on the second surface 10b of the sensor film 10. The extension-suppression layer 70 is formed on the second surface 10b of the sensor film 10 by bonding using an adhesive, application, or the like. The extension-suppression layer 70 is preferably formed of a transparent material having an extensibility that is lower than or equal to the extensibility of the material of the transparent base 101. Examples of the material of the extension-suppression layer 70 include polyethylene terephthalate (PET), polyethylene naphthalate (PEN), light-transmissive polyimide, and the like. For example, the extension-suppression layer 70 may be formed of the same material as the material of the transparent base 101 and may have substantially the same thickness as the thickness of the transparent base 101. If the extension-suppression layer 70 is formed of the same the material as the material of the transparent base 101 and has the same thickness as the thickness of the transparent base 101, the extension amount of the detection area VA in the sensor film 10 can be suppressed to about 50 percent (%) of that in a case in which the extension-suppression layer 70 is not provided. Note that the extension amount of the detection area VA in the sensor film 10 can be adjusted by, not only changing the material of the extension-suppression layer 70, but also changing the thickness of the extension-suppression layer 70.

Figure 4C:
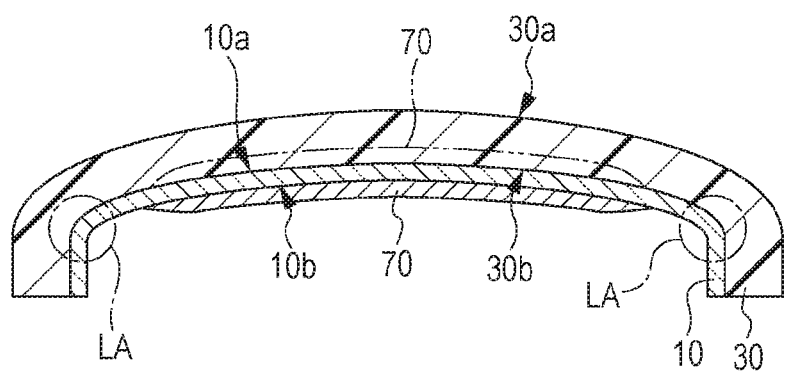

Then, in the formation of the resin layer 30 in step S103, as illustrated in FIG. 4C, the sensor film 10 on which the electrode layer and the lead wire 42 are formed and the extension-suppression layer 70 that is formed on the sensor film 10 by bonding, application, or the like are inserted in a mold for injection molding, and a material containing a light-transmissive resin is poured into the mold. Thus, the resin layer 30 illustrated in FIG. 4C is formed. That is, a stack of the sensor film 10, the extension-suppression layer 70, and the resin layer 30 is formed by In-Mold Lamination (IML). At this time, the sensor film 10 is deformed in accordance with the shape of the mold between the mold and the resin-containing material that has been poured into the mold, and the sensor film 10 extends.

If the three-dimensional curved surface (second curved surface) having a radius of curvature smaller than a radius of curvature of the three-dimensional curved surface (first curved surface) in the detection area VA is present in an area (non-detection area NS) outside the detection area VA in the sensor film 10, the absence of the extension-suppression layer 70 causes the minimum radius of curvature area LA to extend in IML. Thus, a tensile strength generated by the extension might possibly affect the detection area in the sensor film 10 in such a manner that the detection area extends more than the allowable extension amount and is destructed.

In contrast, in the manufacturing method of the input apparatus 1 according to the embodiment, the extension-suppression layer 70 is formed on the second surface 10b of the sensor film 10, and the stack of the sensor film 10, the extension-suppression layer 70, and the resin layer 30 is formed by IML. Accordingly, even if the curved surface (second curved surface) having the minimum radius of curvature is present in the non-detection area NA in the sensor film 10, the extension amount of the detection area VA in the sensor film 10 can be suppressed to be smaller than the extension amount of the non-detection area NA in the sensor film 10 when the sensor film 10 extends by IML. This makes it possible to locally control the extension portion of the sensor film 10 having a two-dimensional or three-dimensional curved surface and to suppress destruction of the detection area VA of the sensor film 10. Therefore, it is possible to cancel the restriction of the extension amount of the minimum radius of curvature area LA by the shape of the input apparatus 1 and to realize the input apparatus 1 having a desired three-dimensional curved surface.

Figure 4D:
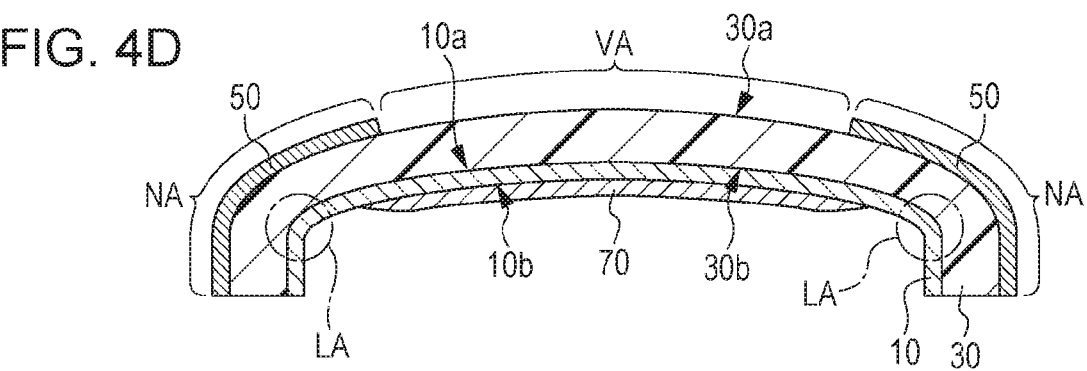

Then, in the formation of the decoration layer 50 in step S104, as illustrated in FIG. 4D, the decoration layer 50 is formed on the first surface 30a of the resin layer 30 to cover the non-detection area NA. The decoration layer 50 is formed to surround the detection area VA with a light-blocking material by printing or application. Alternatively, the decoration layer 50 may be formed by sputtering, evaporation, or the like.

In the manufacturing method of the input apparatus 1 according to the embodiment, as a preceding step of insertion of the sensor film 10 and the extension-suppression layer 70 formed on the sensor film 10 by bonding, application, or the like, into the mold for injection molding, preforming may be performed by heating the sensor film 10 and the extension-suppression layer 70 to a predetermined temperature. That is, as a step between step S102 and step S103, preforming may be performed on the sensor film 10 and the extension-suppression layer 70 to form a stack of the sensor film 10 and the extension-suppression layer 70. In this case, the sensor film 10 barely extends at the time of formation of the resin layer 30 in step S103.

If preforming is performed on the sensor film 10 and the extension-suppression layer 70, the sensor film 10 and the extension-suppression layer 70 can be accurately set in the mold. Thus, a molten resin for forming the resin layer 30 can be applied to the entire mold, increasing the degree of completeness at the time of molding. That is, generation of defective pieces can be suppressed, and the quality of the input apparatus 1 can be enhanced.

The extension-suppression layer 70 may also be formed on the first surface 10a side of the sensor film 10 in step S102 as illustrated as the extension-suppression layer 70 marked with the chain double-dashed line in FIG. 4B. That is, in step S102, the extension-suppression layer 70 is formed on at least one of the second surface 10b side of the sensor film 10 and the first surface 10a side of the sensor film 10. If the extension-suppression layer 70 is formed on the first surface 10a side of the sensor film 10, the extension-suppression layer 70 is formed as marked with the chain double-dashed line in FIG. 4C.

Figure 5:
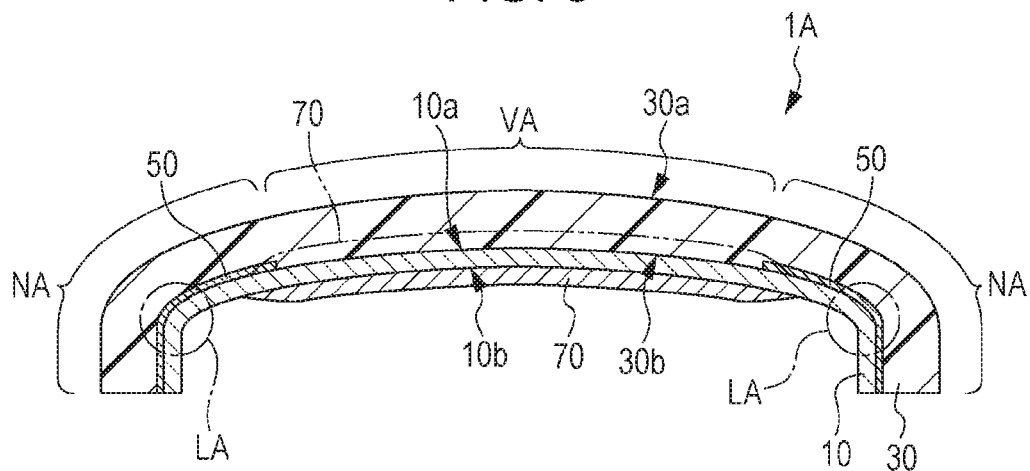
FIG. 5 is a schematic cross-sectional view of another input apparatus according to the embodiment, taken along line V-V in FIG. 1.

FIG. 5 is a schematic cross-sectional view of another input apparatus according to the embodiment, taken along line V-V in FIG. 1.

An input apparatus 1A according to the embodiment includes the sensor film 10, the resin layer 30, the decoration layer 50, and the extension-suppression layer 70.

While the decoration layer 50 of the input apparatus 1 described above with reference to FIGS. 1 and 2 is provided on the first surface 30a of the resin layer 30 to cover the non-detection area NA, the decoration layer 50 of the input apparatus 1A according to the embodiment is provided in the non-detection area NA on the first surface 10a of the sensor film 10. The sensor film 10 of the input apparatus 1A according to the embodiment has a three-dimensional curved surface (first curved surface) in the detection area VA and a three-dimensional curved surface (second curved surface) in the non-detection area NA (minimum radius of curvature area LA), the second curved surface having a radius of curvature (minimum radius of curvature) smaller than a radius of curvature of the three-dimensional curved surface (first curved surface) in the detection area VA. The other layers have the same configuration and are formed of the same materials as those in the input apparatus 1 described above with reference to FIGS. 1 and 2.

Also in the input apparatus 1A according to the embodiment, the extension-suppression layer 70 may also be formed on the first surface 10a side of the sensor film 10 as illustrated as the extension-suppression layer 70 marked with the chain double-dashed line in FIG. 5. That is, the extension-suppression layer 70 is formed on at least one of the second surface 10b side of the sensor film 10 and the first surface 10a side of the sensor film 10.

In the input apparatus 1A according to the embodiment, after the decoration layer 50 has been formed on the sensor film 10, the stack of the sensor film 10, the extension-suppression layer 70, the decoration layer 50, and the resin layer 30 can be formed by IML.

This process will further be described with reference to some of the drawings.

Figure 6:
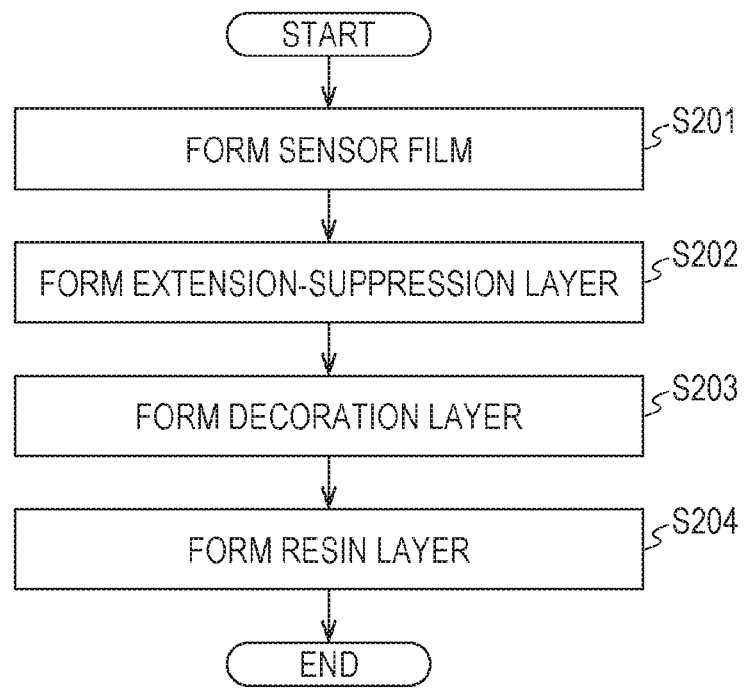
FIG. 6 is a flowchart of another exemplary manufacturing method of the input apparatus according to the embodiment.

FIG. 6 is a flowchart of another exemplary manufacturing method of the input apparatus according to the embodiment. FIGS. 7A to 7D are each a schematic cross-sectional view for illustrating the other exemplary manufacturing method of the input apparatus according to the embodiment.

As illustrated in FIG. 6, the manufacturing method of the input apparatus 1A according to the embodiment includes formation of the sensor film 10 (step S201), formation of the extension-suppression layer 70 (step S202), formation of the decoration layer 50 (step S203), and formation of the resin layer 30 (step S204). Note that the formation of the decoration layer 50 (step S203) may be performed before the formation of the extension-suppression layer 70 (step S202).

First, the manufacturing method in steps S201 and S202 (FIGS. 7A and 7B) is the same as the manufacturing method in steps S101 and S102 described above with reference to FIGS. 3 and 4A to 4D.

Figure 7A:
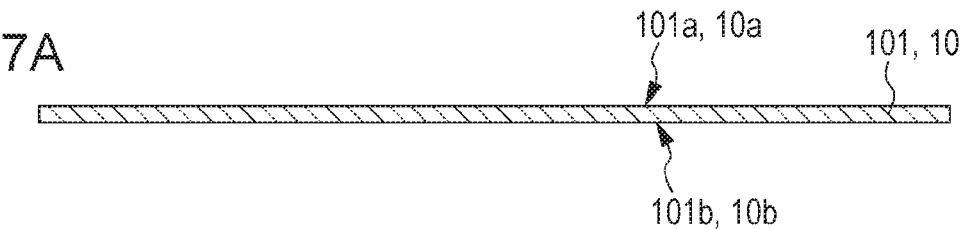
FIGS. 7A to 7D are each a schematic cross-sectional view for illustrating the other exemplary manufacturing method of the input apparatus according to the embodiment.
Figure 7B:
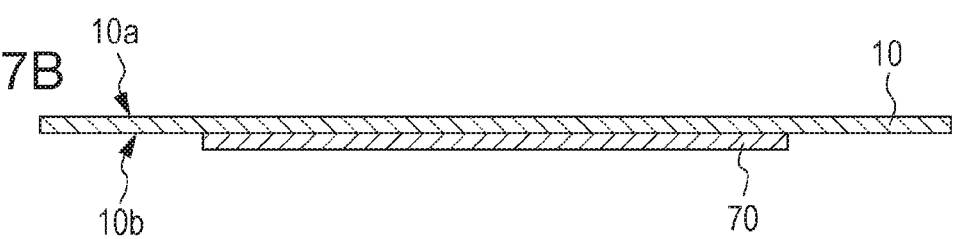
Figure 7C:
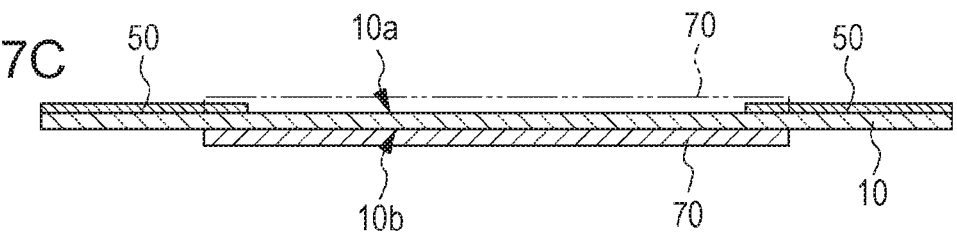

Then, in the formation of the decoration layer 50 in step S203, as illustrated in FIG. 7C, the decoration layer 50 is formed in the non-detection area NA on the first surface 10a side of the sensor film 10. The decoration layer 50 is formed to surround the detection area VA with a light-blocking material by printing or application. Alternatively, the decoration layer 50 may be formed by sputtering, evaporation, or the like.

The extension-suppression layer 70 may also be formed on the first surface 10a side of the sensor film 10 as illustrated as the extension-suppression layer 70 marked with the chain double-dashed line in FIG. 7C. That is, in step S202, the extension-suppression layer 70 is formed on at least one of the second surface 10b side of the sensor film 10 and the first surface 10a side of the sensor film 10. If the extension-suppression layer 70 is formed on the first surface 10a side of the sensor film 10, the extension-suppression layer 70 is formed after the formation of the decoration layer 50.

Figure 7D:
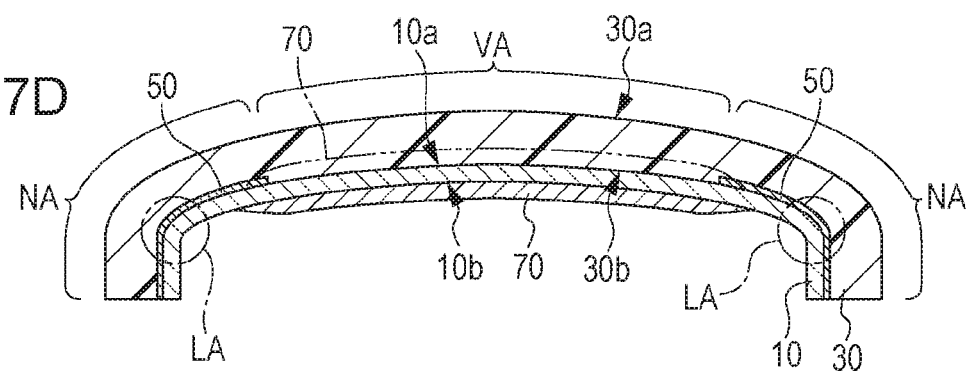

Then, in the formation of the resin layer 30 in step S204, as illustrated in FIG. 7D, the sensor film 10 on which the electrode layer and the lead wire 42 are formed and the extension-suppression layer 70 and the decoration layer 50 that are formed on the sensor film 10 are inserted in a mold for injection molding, and a material containing a light-transmissive synthetic resin is poured into the mold. Thus, the resin layer 30 illustrated in FIG. 7D is formed. That is, a stack of the sensor film 10, the extension-suppression layer 70, the decoration layer 50, and the resin layer 30 is formed by IML.

In the manufacturing method of the input apparatus 1A according to the embodiment, after the extension-suppression layer 70 and the decoration layer 50 have been formed on the sensor film 10, the stack of the sensor film 10, the extension-suppression layer 70, the decoration layer 50, and the resin layer 30 can be formed by IML. In addition, other effects that are substantially the same as the effects of the manufacturing method of the input apparatus 1 described above with reference to FIGS. 3 and 4A to 4D can be obtained.

The decoration layer 50 may also be provided in the non-detection area NA on the second surface 10b side of the sensor film 10. However, regardless of whether the decoration layer 50 is provided on the first surface 10a side or the second surface 10b side of the sensor film 10, the decoration layer 50 needs to be provided in front of (above in FIG. 7D) the electrode layer and the lead wire 42 as viewed from the first surface 30a side of the resin layer 30 after IML. Also in the manufacturing method of the input apparatus 1A according to the embodiment, as a step between step S203 and step S204, preforming may be performed on the sensor film 10, the extension-suppression layer 70, and the decoration layer 50 to form a stack of the sensor film 10, the extension-suppression layer 70, and the decoration layer 50.

Figure 8:
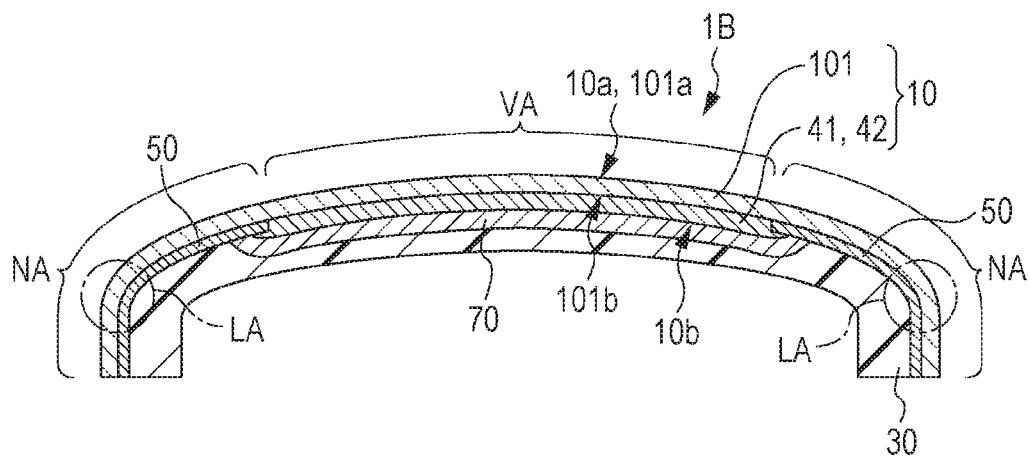
FIG. 8 is a schematic cross-sectional view of still another input apparatus according to the embodiment, taken along line VIII-VIII in FIG. 1.

FIG. 8 is a schematic cross-sectional view of still another input apparatus according to the embodiment, taken along line VIII-VIII in FIG. 1.

An input apparatus 1B according to the embodiment includes the sensor film 10, the resin layer 30, the decoration layer 50, and the extension-suppression layer 70. The sensor film 10 includes the transparent base 101, an electrode layer 41, and the lead wire 42.

The transparent base 101 of the sensor film 10 is light-transmissive and is formed of a base in the form of a film made of polyethylene terephthalate (PET) or the like. The decoration layer 50 is provided in the non-detection area NA on the second surface 101b of the transparent base 101 (the second surface 10b of the sensor film 10).

The electrode layer 41 is provided in the detection area VA on the second surface 101b of the transparent base 101. The electrode layer 41 is light-transmissive and is one of detection electrodes in a touch sensor. The electrode layer 41 is formed of indium tin oxide (ITO), a light-transmissive organic conductive layer, a metal nanowire, or the like. Part of the lead wire 42 is provided behind (below in FIG. 8) the decoration layer 50 in the non-detection area NA. The lead wire 42 includes, as illustrated in FIG. 1, a flexible wiring board that extends outside from the sensor film 10 and a wire that is connected to the electrode layer 41 and led outside the detection area VA of the sensor film 10.

The extension-suppression layer 70 is formed on a surface of the electrode layer 41 facing away from the transparent base 101 as viewed from the electrode layer 41 side. That is, the extension-suppression layer 70 is provided on the second surface 10b side of the sensor film 10. The extension-suppression layer 70 is formed in the detection area VA by bonding using an adhesive, application, or the like.

The resin layer 30 is provided to face away from the transparent base 101 as viewed from the extension-suppression layer 70. The resin layer 30 is provided below the sensor film 10 to cover the detection area VA and the non-detection area NA. The resin layer 30 is light-transmissive and is formed by injection molding in which a material containing a molten synthetic resin is injected into a mold.

The sensor film 10 of the input apparatus 1B according to the embodiment has a three-dimensional curved surface (first curved surface) in the detection area VA and a three-dimensional curved surface (second curved surface) in the non-detection area NA (minimum radius of curvature area LA), the second curved surface having a radius of curvature (minimum radius of curvature) smaller than a radius of curvature of the three-dimensional curved surface (first curved surface) in the detection area VA. The other layers have the same configuration and are formed of the same materials as those in the input apparatus 1 described above with reference to FIGS. 1 and 2.

The input apparatus 1B according to the embodiment can produce substantially the same effects as the effects of the input apparatus 1 described above with reference to FIGS. 1 and 2. In addition, since the sensor film 10 is present in front of the resin layer 30, even if the resin layer 30 is damaged, scattering of the resin layer 30 can be suppressed.

Figure 9:
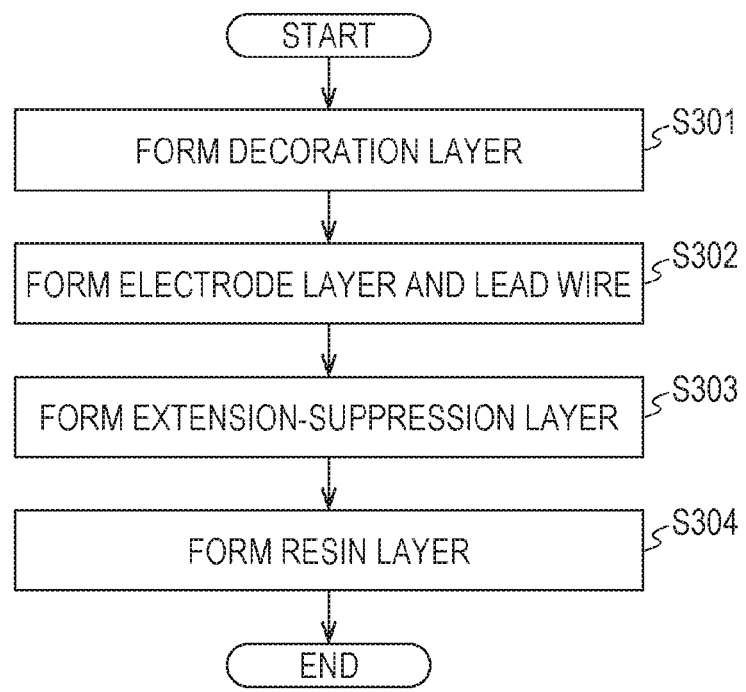
FIG. 9 is a flowchart of still another exemplary manufacturing method of the input apparatus according to the embodiment.

FIG. 9 is a flowchart of still another exemplary manufacturing method of the input apparatus according to the embodiment. FIGS. 10A to 10E are each a schematic cross-sectional view for illustrating the still other exemplary manufacturing method of the input apparatus according to the embodiment.

As illustrated in FIG. 9, the manufacturing method of the input apparatus 1B according to the embodiment includes formation of the decoration layer 50 (step S301), formation of the electrode layer 41 and the lead wire 42 (step S302), formation of the extension-suppression layer 70 (step S303), and formation of the resin layer 30 (step S304).

Figure 10A:
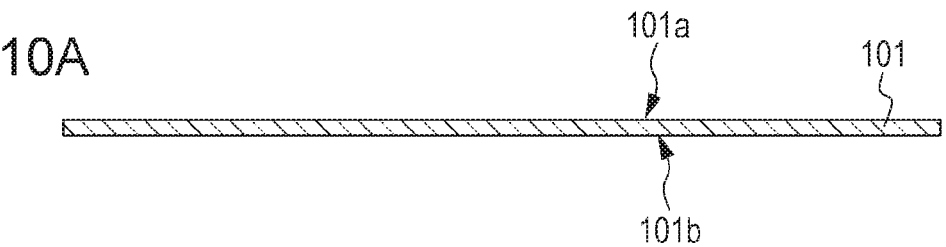
FIGS. 10A to 10E are each a schematic cross-sectional view for illustrating the still other exemplary manufacturing method of the input apparatus according to the embodiment.
Figure 10B:
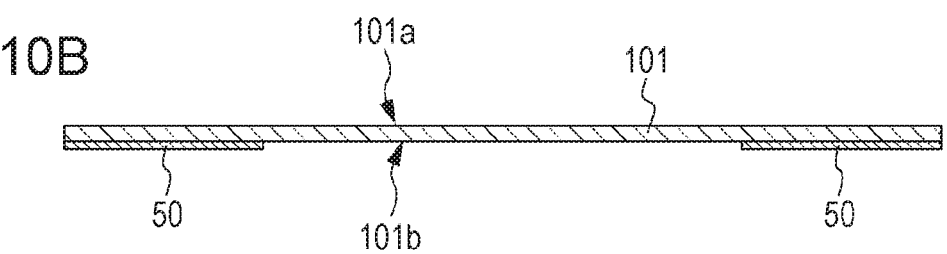

First, in the formation of the decoration layer 50 in step S301, as illustrated in FIGS. 10A and 10B, the transparent base 101 is prepared, and the decoration layer 50 is formed in the non-detection area NA on the second surface 101b of the transparent base 101. For example, a base in the form of a film made of polyethylene terephthalate (PET) is used as the transparent base 101. The decoration layer 50 is formed to surround the detection area VA with a light-blocking material by printing or application. Alternatively, the decoration layer 50 may be formed by sputtering, evaporation, or the like.

Figure 10C:
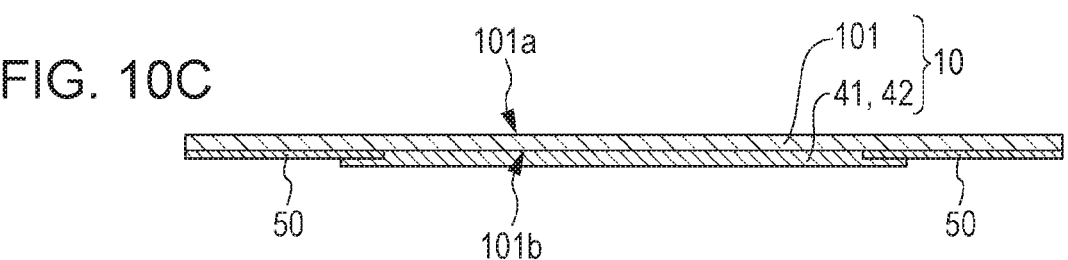

Then, in the formation of the electrode layer 41 and the lead wire 42 in step S302, as illustrated in FIG. 10C, the electrode layer 41 is formed in the detection area VA on the second surface 101b side of the transparent base 101, and part of the lead wire 42 is formed behind (below in FIG. 10C) the decoration layer 50 in the non-detection area NA. Note that the remaining part of the lead wire 42 is provided on the flexible wiring board (see FIG. 1). As described above with reference to FIGS. 3 and 4A to 4D, the electrode layer 41 and the lead wire 42 are formed by photolithography, etching, and screen printing. Thus, the sensor film 10 is formed.

Figure 10D:
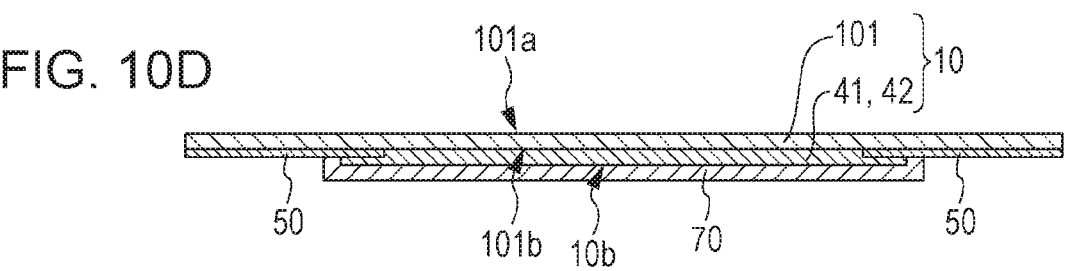

Then, in the formation of the extension-suppression layer 70 in step S303, as illustrated in FIG. 10D, the extension-suppression layer 70 is formed on a surface of the electrode layer 41 facing away from the transparent base 101 as viewed from the electrode layer 41. That is, the extension-suppression layer 70 is formed on the second surface 10b side of the sensor film 10. The extension-suppression layer 70 is formed by bonding using an adhesive, application, or the like. The extension-suppression layer 70 is preferably formed of a transparent material having an extensibility that is lower than or equal to the extensibility of the material of the transparent base 101. For example, the extension-suppression layer 70 may be formed of the same material as the material of the transparent base 101 and may have substantially the same thickness as the thickness of the transparent base 101. Examples of the material of the extension-suppression layer 70 are described above with reference to FIGS. 3 and 4A to 4D.

Figure 10E:
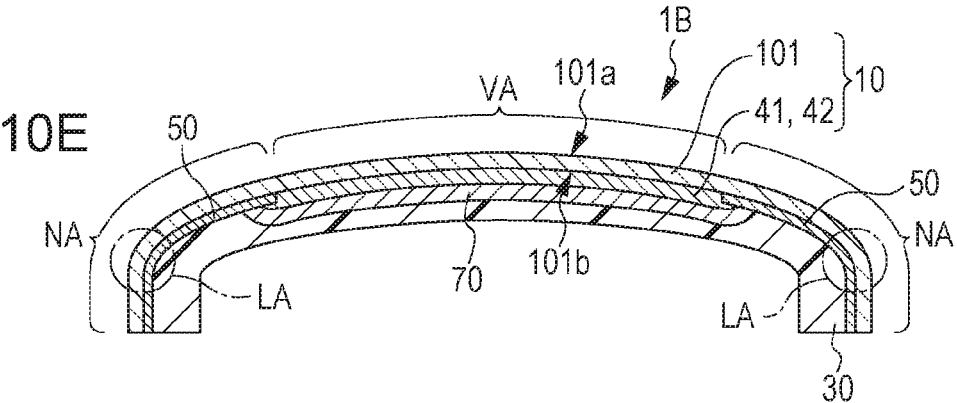

Then, in the formation of the resin layer 30 in step S304, as illustrated in FIG. 10E, the sensor film 10 on which the electrode layer 41 and the lead wire 42 are formed and the decoration layer 50 and the extension-suppression layer 70 that are formed on the sensor film 10 are inserted in a mold for injection molding, and a material containing a light-transmissive synthetic resin is poured into the mold. Thus, the resin layer 30 illustrated in FIG. 10E is formed. That is, a stack of the sensor film 10, the decoration layer 50, the extension-suppression layer 70, and the resin layer 30 is formed by IML.

The manufacturing method of the input apparatus 1B according to the embodiment can produce substantially the same effects as the effects of the manufacturing method of the input apparatus 1 described above with reference to FIGS. 1 and 2. In addition, since the sensor film 10 is formed in front of the resin layer 30, even if the resin layer 30 is damaged, it is possible to manufacture the input apparatus 1B in which the scattering of the resin layer 30 can be suppressed.

Also in the manufacturing method of the input apparatus 1B according to the embodiment, as a step between step S303 and step S304, preforming may be performed on the sensor film 10, the decoration layer 50, and the extension-suppression layer 70 to form a stack of the sensor film 10, the decoration layer 50, and the extension-suppression layer 70.

Figure 11:
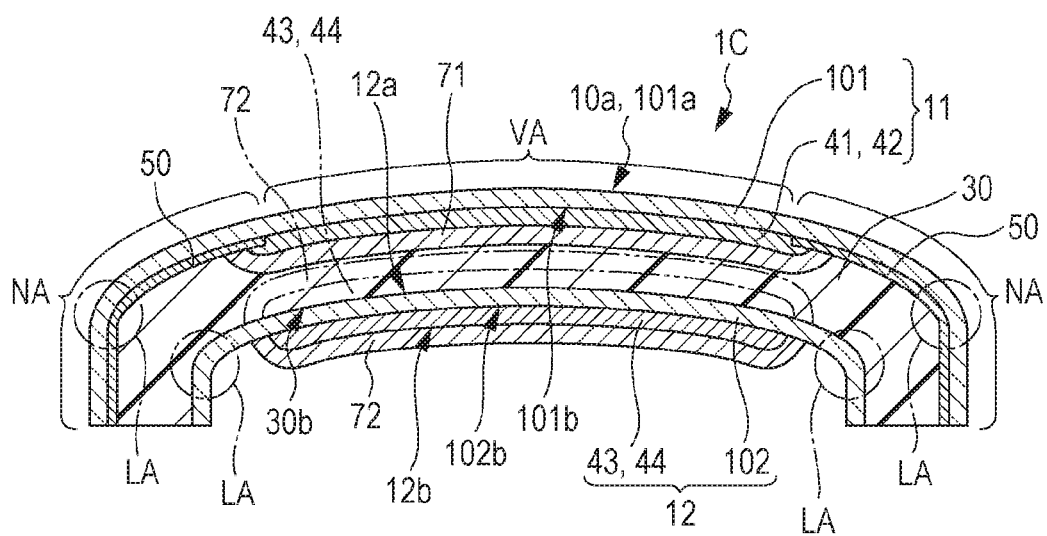
FIG. 11 is a schematic cross-sectional view of further another input apparatus according to the embodiment, taken along line XI-XI in FIG. 1.
Figure 13A:
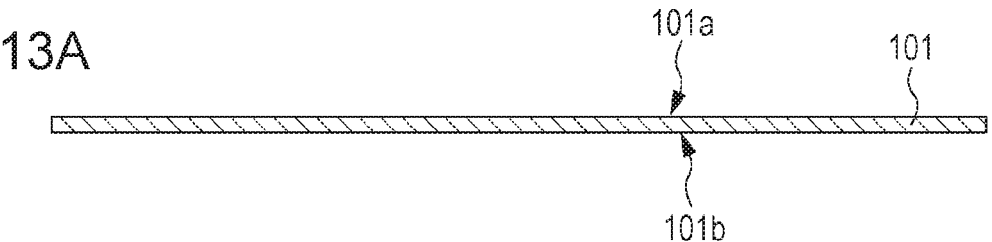
FIGS. 13A to 13D are each a schematic cross-sectional view for illustrating the still other exemplary manufacturing method of the input apparatus according to the embodiment.
Figure 13B:
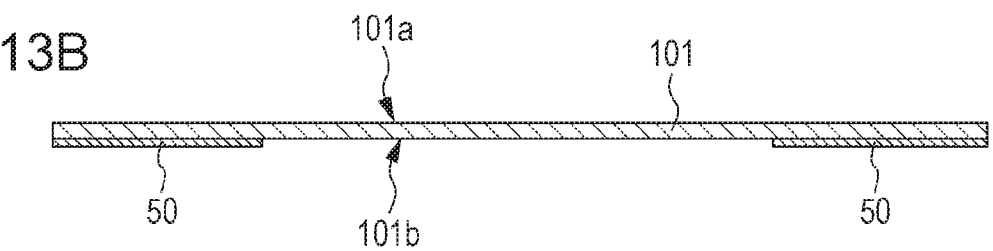
Figure 13C:
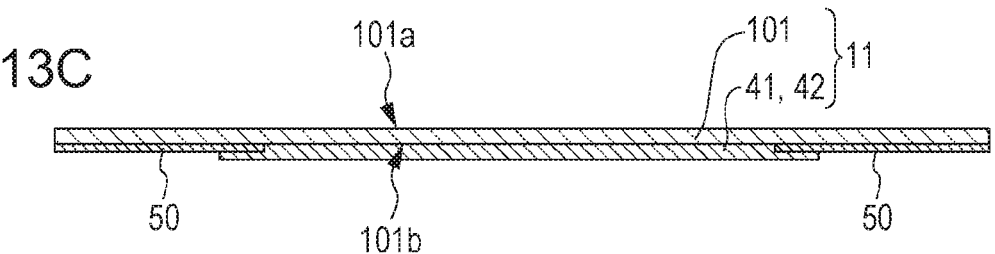
Figure 13D:
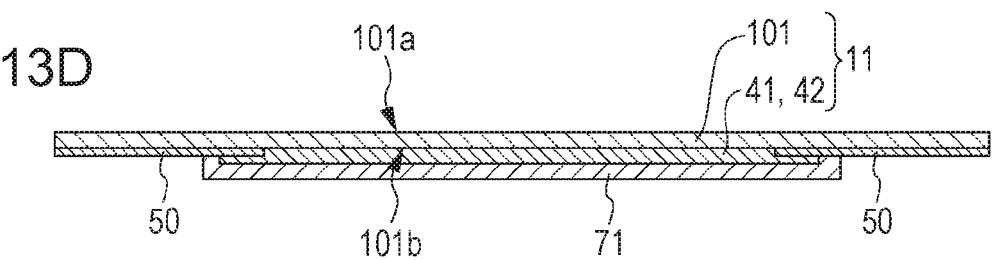

FIG. 11 is a schematic cross-sectional view of further another input apparatus according to the embodiment, taken along line XI-XI in FIG. 1.

An input apparatus 1C according to the embodiment includes a first sensor film 11, a second sensor film 12, the resin layer 30, the decoration layer 50, a first extension-suppression layer 71, and a second extension-suppression layer 72. The first sensor film 11 includes the first transparent base 101, the first electrode layer 41, and the first lead wire 42. The second sensor film 12 includes a second transparent base 102, a second electrode layer 43, and a second lead wire 44.

The layers in the first sensor film 11 have the same configuration and are formed of the same materials as those of the layers in the sensor film 10 described above with reference to FIG. 8.

The second transparent base 102 of the second sensor film 12 is provided on the second surface 30b of the resin layer 30. The second transparent base 102 is light-transmissive and is formed of a base in the form of a film made of polyethylene terephthalate (PET) or the like.

The second electrode layer 43 is provided in the detection area VA on a second surface 102b of the second transparent base 102. The second electrode layer 43 is light-transmissive and is one of detection electrodes in a touch sensor. The second electrode layer 43 is formed of indium tin oxide (ITO), a light-transmissive organic conductive layer, a metal nanowire, or the like. Part of the second lead wire 44 is provided behind (below in FIG. 11) the decoration layer 50 in the non-detection area NA. The second lead wire 44 includes a flexible wiring board that extends outside from the second sensor film 12 and a wire that is connected to the second electrode layer 43 and led outside the detection area VA of the second sensor film 12.

Thus, in the input apparatus 1C according to the embodiment, the first electrode layer 41 is provided on either side of the resin layer 30, and the second electrode layer 43 is provided on the other side of the resin layer 30. That is, the resin layer 30 is provided between the first electrode layer 41 and the second electrode layer 43. In other words, the resin layer 30 is provided between the first sensor film 11 and the second sensor film 12.

Accordingly, the input apparatus 1C can serve as a mutual capacitive sensor. That is, the input apparatus 1C applies a driving voltage to a line of one electrode layer of the first electrode layer 41 and the second electrode layer 43 and detects a change in electrostatic capacitance between a finger and the other electrode layer of the first electrode layer 41 and the second electrode layer 43. Thus, the input apparatus 1C detects an X-coordinate of a finger position by using the one electrode layer and a Y-coordinate of the finger position by using the other electrode layer.

The second extension-suppression layer 72 is formed on a surface of the second electrode layer 43 facing away from the second transparent base 102 as viewed from the second electrode layer 43. That is, the second extension-suppression layer 72 is provided on a second surface 12b side of the second sensor film 12. The second extension-suppression layer 72 is formed in the detection area VA by bonding using an adhesive, application, or the like.

The second electrode layer 43 and the second extension-suppression layer 72 may also be formed on a first surface 12a side of the second sensor film 12 as illustrated as the second electrode layer 43 and the second extension-suppression layer 72 marked with the chain double-dashed line in FIG. 11. That is, the second electrode layer 43 and the second extension-suppression layer 72 may be formed between the second transparent base 102 and the resin layer 30.

The first sensor film 11 of the input apparatus 1C according to the embodiment has a three-dimensional curved surface (first curved surface) in the detection area VA and a three-dimensional curved surface (second curved surface) in the non-detection area NA (minimum radius of curvature area LA), the second curved surface having a radius of curvature (minimum radius of curvature) smaller than a radius of curvature of the three-dimensional curved surface (first curved surface) in the detection area VA. In addition, the second sensor film 12 of the input apparatus 1C according to the embodiment has a three-dimensional curved surface (third curved surface) in the detection area VA and a three-dimensional curved surface (fourth curved surface) in the non-detection area NA (minimum radius of curvature area LA), the fourth curved surface having a radius of curvature (minimum radius of curvature) smaller than a radius of curvature of the three-dimensional curved surface (third curved surface) in the detection area VA. The other layers have the same configuration and are formed of the same materials as those in the input apparatus 1 described above with reference to FIGS. 1 and 2.

The input apparatus 1C according to the embodiment can produce substantially the same effects as the effects of the input apparatus 1B described above with reference to FIG. 8. In addition, even if a plurality of sensor films (the first sensor film 11 and the second sensor film 12 in the embodiment) are provided, the extension amount of each of the plurality of sensor films can fall within a range of the allowable extension amount. This makes it possible to locally control extension portions of the respective plurality of sensor films and to suppress destruction of the detection area VA of the plurality of sensor films. Therefore, it is possible to cancel the restriction of the extension amount of the minimum radius of curvature area LA by the shape of the input apparatus 1C and to realize the input apparatus 1C having a desired three-dimensional curved surface.

FIG. 12 is a flowchart of still another exemplary manufacturing method of the input apparatus according to the embodiment. FIGS. 13A to 13D and 14A to 14D are each a schematic cross-sectional view for illustrating the still other exemplary manufacturing method of the input apparatus according to the embodiment.

As illustrated in FIG. 12, the manufacturing method of the input apparatus 1C according to the embodiment includes formation of the decoration layer 50 (step S401), formation of the first electrode layer 41 and the first lead wire 42 (step S402), formation of the first extension-suppression layer 71 (step S403), formation of the second electrode layer 43 and the second lead wire 44 (step S404), formation of the second extension-suppression layer 72 (step S405), and formation of the resin layer 30 (step S406).

First, as illustrated in FIGS. 13A to 13D, the manufacturing method in steps S401 to S403 is the same as the manufacturing method in steps S301 to S303 described above with reference to FIGS. 9 and 10A to 10E. The first extension-suppression layer 71 is preferably formed of a transparent material having an extensibility that is lower than or equal to the extensibility of the material of the first transparent base 101. Examples of the material of the first extension-suppression layer 71 include polyethylene terephthalate (PET), polyethylene naphthalate (PEN), light-transmissive polyimide, and the like. For example, the first extension-suppression layer 71 may be formed of the same material as the material of the first transparent base 101 and may have substantially the same thickness as the thickness of the first transparent base 101.

Figure 14A:
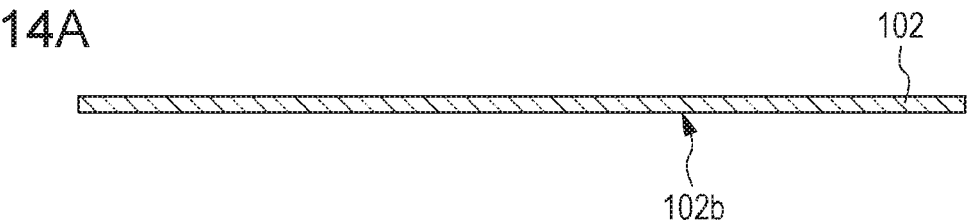
FIGS. 14A to 14D are each a schematic cross-sectional view for illustrating the still other exemplary manufacturing method of the input apparatus according to the embodiment.
Figure 14B:
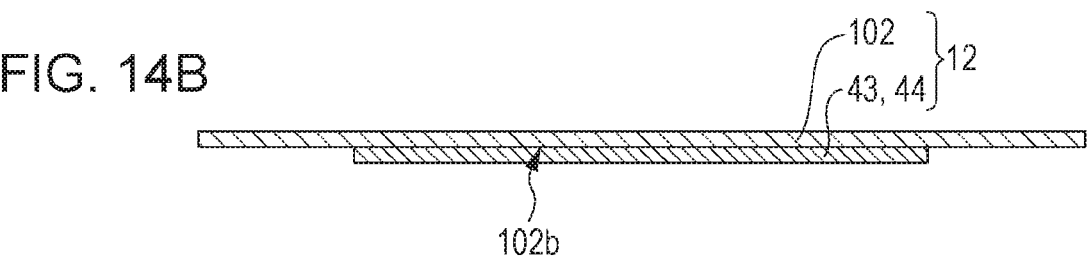

Then, in the formation of the second electrode layer 43 and the second lead wire 44 in step S404, as illustrated in FIGS. 14A and 14B, the second transparent base 102 is prepared, the second electrode layer 43 is formed in the detection area VA on the second surface 102b side of the second transparent base 102, and part of the second lead wire 44 is formed in an area behind (below in FIG. 14B) the decoration layer 50 in the non-detection area NA. Note that the remaining part of the second lead wire 44 is provided on the flexible wiring board (see FIG. 1). As described above with reference to FIGS. 3 and 4A to 4D, the second electrode layer 43 and the second lead wire 44 are formed by photolithography, etching, and screen printing. Thus, the second sensor film 12 is formed.

Figure 14C:
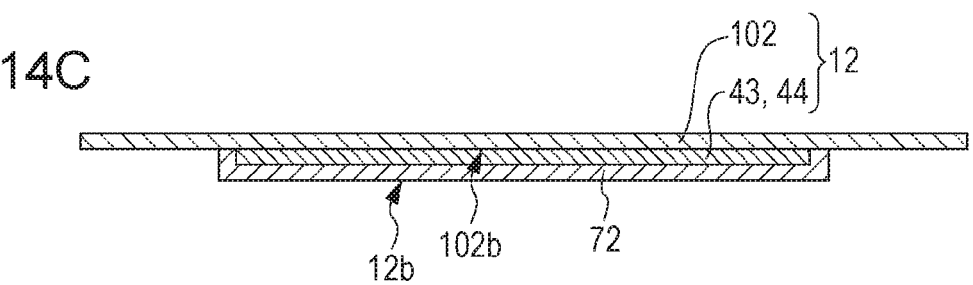

Then, in the formation of the second extension-suppression layer 72 in step S405, as illustrated in FIG. 14C, the second extension-suppression layer 72 is formed on a surface of the second electrode layer 43 facing away from the second transparent base 102 as viewed from the second electrode layer 43. That is, the second extension-suppression layer 72 is formed on the second surface 12b side of the second sensor film 12. The second extension-suppression layer 72 is formed by bonding using an adhesive, application, or the like. The second extension-suppression layer 72 is preferably formed of a transparent material having an extensibility that is lower than or equal to the extensibility of the material of the second transparent base 102. Examples of the material of the second extension-suppression layer 72 include polyethylene terephthalate (PET), polyethylene naphthalate (PEN), light-transmissive polyimide, and the like. For example, the second extension-suppression layer 72 may be formed of the same material as the material of the second transparent base 102 and may have substantially the same thickness as the thickness of the second transparent base 102.

Figure 14D:
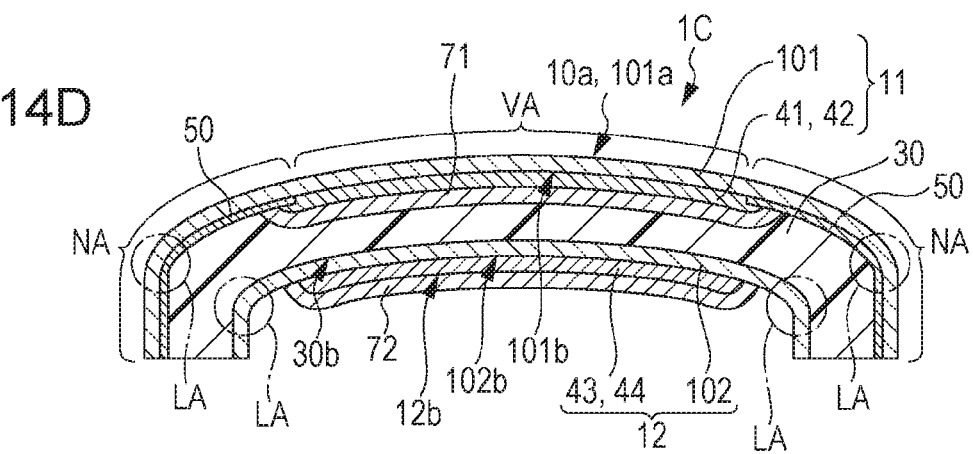

Then, in the formation of the resin layer 30 in step S406, as illustrated in FIG. 14D, the first sensor film 11 on which the first electrode layer 41 and the first lead wire 42 are formed, the decoration layer 50 and the first extension-suppression layer 71 that are formed on the first sensor film 11, the second sensor film 12 on which the second electrode layer 43 and the second lead wire 44 are formed, and the second extension-suppression layer 72 that is formed on the second sensor film 12 are inserted in a mold for injection molding, and a material containing a light-transmissive synthetic resin is poured into the mold. Thus, the resin layer 30 illustrated in FIG. 14D is formed. That is, a stack of the first sensor film 11, the decoration layer 50, the first extension-suppression layer 71, the resin layer 30, the second sensor film 12, and the second extension-suppression layer 72 is formed by IML.

The manufacturing method of the input apparatus 1C according to the embodiment can produce substantially the same effects as the effects of the manufacturing method of the input apparatus 1 described above with reference to FIGS. 1 and 2. In addition, even if a plurality of sensor films (the first sensor film 11 and the second sensor film 12 in the embodiment) are provided, it is possible to manufacture the input apparatus 1C in which the extension amount of each of the plurality of sensor films can fall within a range of the allowable extension amount.

Also in the manufacturing method of the input apparatus 1C according to the embodiment, as a step between step S405 and step S406, preforming may be performed on the first sensor film 11, the decoration layer 50, the first extension-suppression layer 71, the second sensor film 12, and the second extension-suppression layer 72 to form a stack of the first sensor film 11, the decoration layer 50, and the first extension-suppression layer 71, and a stack of the second sensor film 12 and the second extension-suppression layer 72.

In addition, steps S401 to S403 may be performed between step S405 and step S406. That is, the manufacturing steps of the first sensor film 11 may be performed independently of the manufacturing steps of the second sensor film 12.

As described above, according to the embodiment, it is possible to provide the input apparatuses 1, 1A, 1B, and 1C that can locally control the extension portion of the sensor film 10 having a two-dimensional or three-dimensional curved surface and can suppress destruction of the detection area VA of the sensor film 10, and the manufacturing methods of the input apparatuses 1, 1A, 1B, and 1C.

Although the embodiment has been described above, the present invention is not limited to the above examples. For example, addition or deletion of a component or components, design change, and a combination of features of the embodiment made to the above-described embodiment as appropriate by a person skilled in the art are also included in the scope of the present invention without departing from the spirit of the present invention.

What is claimed is:

1. An input apparatus having a detection area in which a sensor is formed and a non-detection area other than the detection area, the input apparatus comprising:
    a sensor film including:
        a first curved portion corresponding to the detection area, the first curved portion being light-transmissive and having a first radius of curvature; and
        a second curved portion corresponding to the non-detection area and having a second radius of curvature smaller than the first radius of curvature;
    a resin layer provided over the sensor film and formed of a material containing a light-transmissive resin; and
    an extension-suppression layer provided on the first portion of the sensor film, the extension-suppression layer suppressing an extension of the sensor film such that an amount of extension of the first curved portion is smaller than an amount of extension of the second curved portion of the sensor film,
    wherein the sensor film includes a light-transmissive base in a form of a film, and extends over the entire detection area and the entire non-detection area of the resin layer, and wherein the extension-suppression layer extends over the entire detection area but only part of the non-detection area without reaching the second curved portion of the sensor film, whereby the amount of extension of the first curved portion of the sensor film is adjusted by at least one of a material of the extension-suppression layer and a thickness of the extension-suppression layer.

2. The input apparatus according to claim 1,
    wherein the sensor film has:
        a first surface formed as a convex curved surface; and
        a second surface opposite to the first surface,
    wherein the resin layer is provided on the first surface, and
    wherein the extension-suppression layer is provided on at least one of the first surface and the second surface.

3. The input apparatus according to claim 1,
    wherein the sensor film has:
        a first surface formed as a convex curved surface; and
        a second surface opposite to the first surface,
    wherein the extension-suppression layer is provided on the second surface, and
    wherein the resin layer is provided on the extension-suppression layer over the second surface of the sensor film.

4. The input apparatus according to claim 1,
    wherein the extension-suppression layer is formed of a same material as a material of the base.

5. The input apparatus according to claim 4,
    wherein the extension-suppression layer has a thickness equal to a thickness of the base.

6. A method for manufacturing an input apparatus having a detection area in which a sensor is formed and a non-detection area other than the detection area, the method comprising:
    forming a sensor film having a light-transmissive base in a form of a film, the sensor film including a first portion corresponding to the detection area and a second portion corresponding to the non-detection area;
    forming an extension-suppression layer on the first portion of the sensor film, the extension-suppression layer suppressing an extension of the sensor film such that an amount of extension of the first portion is smaller than an amount of extension of the second portion of the sensor film; and
    forming a resin layer on the sensor film by inserting the sensor film with the extension-suppression layer formed thereon into a mold, and then pouring a material containing a light-transmissive resin into the mold,
    wherein the forming the resin layer includes:
        deforming the first portion of the sensor film into a first curved portion having a first radius of curvature; and
        deforming the second portion of the sensor film into a second curved portion having a second radius of curvature smaller than the first radius of curvature,
    wherein the sensor film extends over the entire detection area and the entire non-detection area of the resin layer, and wherein the extension-suppression layer extends over the entire detection area but only part of the non-detection area without reaching the second curved portion of the sensor film, whereby the amount of extension of the first curved portion of the sensor film is adjusted by at least one of a material of the extension-suppression layer and a thickness of the extension-suppression layer.

7. The method according to claim 6,
    wherein the sensor film has a first surface, and a second surface opposite to the first surface, wherein in the forming the extension-suppression layer, the extension-suppression layer is provided on at least one of the first surface and the second surface, and wherein in the forming the resin layer, the resin layer is provided on the first surface of the sensor film which is formed as a convex curved surface.

8. The method according to claim 6, wherein the sensor film has a first surface, and a second surface opposite to the first surface, wherein in the forming the extension-suppression layer, the extension-suppression layer is provided on the second surface, and wherein in the forming the resin layer, the resin layer is provided on the extension-suppression layer over the second surface, while the first surface is formed into a convex curved surface.

9. A method for manufacturing an input apparatus having a detection area in which a sensor is formed and a non-detection area other than the detection area, the method comprising:

forming a sensor film having a light-transmissive base in a form of a film, the sensor film including a first portion corresponding to the detection area and a second portion corresponding to the non-detection area;

forming an extension-suppression layer on the first portion of the sensor film, the extension-suppression layer suppressing an extension of the sensor film such that an amount of extension of the first portion is smaller than an amount of extension of the second portion of the sensor film; and forming, by heating the sensor film, the first portion into a first curved portion having a first radius of curvature, and the second portion into a second curved portion having a second radius of curvature smaller than the first radius of curvature;

forming a resin layer on the sensor film by inserting the sensor film with the extension-suppression layer formed thereon into a mold, and then pouring a material containing a light-transmissive resin into the mold, wherein the sensor film extends over the entire detection area and the entire non-detection area of the resin layer, and wherein the extension-suppression layer extends over the entire detection area but only part of the non-detection area without reaching the second curved portion of the sensor film, whereby the amount of extension of the first curved portion of the sensor film is adjusted by at least one of a material of the extension-suppression layer and a thickness of the extension-suppression layer.

\* \* \* \* \*